(12) United States Patent
Ferris et al.

(10) Patent No.: US 8,464,239 B2
(45) Date of Patent: Jun. 11, 2013

(54) REAL-TIME INSTALLATION AND/OR CONFIGURATION ASSISTANT

(75) Inventors: James M. Ferris, Cary, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1225 days.

(21) Appl. No.: 11/760,952

(22) Filed: Jun. 11, 2007

(65) Prior Publication Data

US 2008/0307413 A1    Dec. 11, 2008

(51) Int. Cl.
*G06F 9/44* (2006.01)
*G06F 9/445* (2006.01)

(52) U.S. Cl.
USPC .......................................... 717/168; 717/174

(58) Field of Classification Search
USPC ......................................................... 717/168
See application file for complete search history.

(56) References Cited

U.S. PATENT DOCUMENTS

| | | | |
|---|---|---|---|
| 5,450,545 A * | 9/1995 | Martin et al. ................. | 717/109 |
| 5,555,416 A | 9/1996 | Owens et al. | |
| 6,032,184 A * | 2/2000 | Cogger et al. ................ | 709/223 |
| 6,161,176 A | 12/2000 | Hunter et al. | |
| 6,167,567 A * | 12/2000 | Chiles et al. .................. | 717/173 |
| 6,230,287 B1 * | 5/2001 | Pinard et al. .................... | 714/31 |
| 6,239,800 B1 * | 5/2001 | Mayhew et al. .............. | 715/764 |
| 6,282,711 B1 | 8/2001 | Halpern et al. | |
| 6,477,531 B1 * | 11/2002 | Sullivan et al. ...................... | 1/1 |
| 6,658,598 B1 * | 12/2003 | Sullivan ......................... | 714/25 |
| 6,718,366 B2 * | 4/2004 | Johnstone et al. ............ | 709/204 |
| 6,744,450 B1 * | 6/2004 | Zimniewicz et al. .......... | 715/841 |
| 6,785,834 B2 * | 8/2004 | Chefalas et al. ................ | 714/4.3 |
| 6,910,072 B2 * | 6/2005 | Macleod Beck et al. ..... | 709/224 |
| 6,973,647 B2 | 12/2005 | Crudele et al. | |
| 7,225,249 B1 * | 5/2007 | Barry et al. .................... | 709/227 |
| 7,281,170 B2 * | 10/2007 | Taylor et al. .................... | 714/48 |
| 7,523,082 B2 * | 4/2009 | Mohan ............................ | 706/45 |
| 7,594,225 B2 | 9/2009 | Barr et al. | |
| 7,805,676 B2 * | 9/2010 | Schemers et al. ............. | 715/711 |
| 7,827,290 B2 * | 11/2010 | Galvin et al. .................. | 709/228 |
| 8,001,542 B2 * | 8/2011 | Edwards et al. .............. | 717/176 |
| 2002/0138786 A1 * | 9/2002 | Chefalas et al. ................ | 714/37 |
| 2003/0043178 A1 * | 3/2003 | Gusler et al. .................. | 345/705 |
| 2003/0088616 A1 * | 5/2003 | Etessami et al. .............. | 709/203 |
| 2004/0083206 A1 * | 4/2004 | Wu et al. ............................ | 707/3 |
| 2004/0250247 A1 | 12/2004 | Deeths et al. | |

(Continued)

OTHER PUBLICATIONS

Cornwell et al. "Practical Optimization Considerations for Diagnostic Knowledge Representation" 1999, retrieved from <http://www.kirshenbaum.net/Evan/Pubs/krr.pdf> total p. 8.*

(Continued)

*Primary Examiner* — Don Wong
*Assistant Examiner* — Marina Lee
(74) *Attorney, Agent, or Firm* — Lowenstein Sandler LLP

(57) ABSTRACT

A system and method of assisting a user include displaying a status of at least one of an installation and configuration within a first of a plurality of windows. A point of progress of at least one of the installation and configuration is monitored. Knowledgebase information is retrieved related to the point of progress. The knowledgebase information is displayed within a second of the plurality of windows to assist the user with the at least one of the installation and configuration. An instant messaging chat session can be displayed within a third of the plurality of windows to assist a user with the at least one of the installation and configuration.

18 Claims, 10 Drawing Sheets

U.S. PATENT DOCUMENTS

| | | | |
|---|---|---|---|
| 2005/0125788 A1* | 6/2005 | Lupini et al. | 717/174 |
| 2005/0132354 A1* | 6/2005 | Edwards et al. | 717/174 |
| 2005/0262501 A1 | 11/2005 | Marinelli et al. | |
| 2006/0010345 A1* | 1/2006 | Schnoebelen et al. | 714/25 |
| 2006/0039547 A1* | 2/2006 | Klein et al. | 379/265.02 |
| 2006/0123409 A1 | 6/2006 | Jordan, III et al. | |
| 2006/0123410 A1 | 6/2006 | Kapoor | |
| 2006/0126801 A1* | 6/2006 | Laperi et al. | 379/32.01 |
| 2006/0253849 A1 | 11/2006 | Avram et al. | |
| 2007/0043687 A1* | 2/2007 | Bodart et al. | 707/1 |
| 2007/0106984 A1 | 5/2007 | Birk Olsen et al. | |
| 2007/0271552 A1 | 11/2007 | Pulley | |
| 2008/0127171 A1 | 5/2008 | Tarassov | |
| 2008/0127175 A1 | 5/2008 | Naranjo et al. | |
| 2008/0154933 A1* | 6/2008 | Galvin et al. | 707/102 |
| 2008/0155534 A1 | 6/2008 | Boss et al. | |
| 2008/0307413 A1* | 12/2008 | Ferris et al. | 717/178 |
| 2008/0320468 A1 | 12/2008 | Ferris et al. | |
| 2009/0043669 A1* | 2/2009 | Hibbets et al. | 705/26 |
| 2009/0043882 A1* | 2/2009 | Hibbets et al. | 709/224 |
| 2009/0064131 A1 | 3/2009 | Ferris et al. | |
| 2009/0144700 A1 | 6/2009 | Huff et al. | |

OTHER PUBLICATIONS

NonFinal Office Action for U.S. Appl. No. 11/947,074, mailed Mar. 30, 2011.

NonFinal Office Action for U.S. Appl. No. 11/947,074, mailed Sep. 28, 2011.

Final Office Action for U.S. Appl. No. 11/947,074, mailed Apr. 23, 2012.

NonFinal Office Action for U.S. Appl. No. 11/767,230, mailed Feb. 28, 2012.

NonFinal Office Action for U.S. Appl. No. 11/767,230, mailed Oct. 27, 2011.

NonFinal Office Action for U.S. Appl. No. 11/767,230, mailed Apr. 27, 2011.

Final Office Action for U.S. Appl. No. 11/848,815, mailed Oct. 14, 2011.

NonFinal Office Action for U.S. Appl. No. 11/848,815, mailed Apr. 20, 2011.

* cited by examiner

```
Main menu

1) Hostname:                            mailhost.example.com
   2) Ldap master host                     mailhost.example.com
   3) Ldap port:                           389
   4) Ldap password:                       set
   5) zimbra-ldap:                         Enabled
        +Create Domain:                    yes
        +Domain to create:                 mailhost.example.com
   6) zimbra-store:                        Enabled
        +Create Admin User:                yes
        +Admin user to create:             admin@mailhost.example.com
******* +Admin Password                    UNSET
        +Enable automated spam training:   yes
        +Spam training user:               fdi0j@mailhost.example.com
        +Non-spam(Ham) training user:      s3nnl@mailhost.example.com
        +Global Documents Account          wiki@mailhost.example.com
        +SMTP host:                        mailhost.example.com
        +Web server HTTP port:             80
        +Web server HTTPS port:            443
        +Web server mode:                  http
        +Enable POP/IMAP proxy:            no
        +IMAP server port:                 143
        +IMAP server SSL port:             993
        +POP server port:                  110
        +POP server SSL port:              995
        +Use spell check server:           yes
        +Spell server URL:                 http://
mailhost.example.com:7780/aspell.php
      ****+License file name:              UNSET
   7) zimbra-mta:                          Enabled
   8) zimbra-snmp:                         Enabled
   9) zimbra-logger:                       Enabled
  10) zimbra-spell:                        Enabled
  11) Enable default backup schedule:      yes
   r) Start servers after configuration    yes
   s) Save config to file
   x) Expand menu
   q) Quit Address unconfigured (**) items  (? - help) 6
```

FIG. 4
(PRIOR ART)

```
Store configuration

1) Status:                          Enabled
    2) Create Admin User:               yes
    3) Admin user to create:            admin@mailhost.example.com
** 4) Admin Password                    UNSET
    5) Enable automated spam training:  yes
    6) Spam training user:              spam.mr8bj@mailhost.example.com
    7) Non-spam(Ham) training user:     ham.yc2hqt@mailhost.example.com
    8) Global Documents Account:        wiki@mailhost.example.com
    9) SMTP host:                       mailhost.example.com
   10) Web server HTTP port:            80
   11) Web server HTTPS port:           443
   12) Web server mode:                 http
   13) Enable POP/IMAP proxy:           no
   14) IMAP server port:                143
   15) IMAP server SSL port:            993
   16) POP server port:                 110
   17) POP server SSL port:             995
   18) Use spell check server:          yes
   19) Spell server URL:                http://
mailhost.example.com:7780/aspell.php
**20) License filename:                 UNSET Select, or 'r' for previous menu [r] 6
```

FIG. 5
(PRIOR ART)

REAL-TIME INSTALLATION AND/OR CONFIGURATION ASSISTANT

FIELD

The embodiments relate to methods and systems for application installation and configuration. More particularly, the embodiments relate to methods and systems that provide real-time assistance to a user for assisted installation and configuration.

BACKGROUND

Computers and computer applications have become a way of life for the majority of society. Although most computers come pre-configured with some computer applications, most users must install and/or configure additional computer applications on their computer to tailor their computer for their particular needs. Such computer application installation and/or configuration can be as easy as a one step activation of an installation program. However, more complex computer applications require a user to provide installation decisions and/or configuration decisions to complete installation of the computer application. Such installation decisions and/or configuration decisions are not always easy to make. Some installation decisions and/or configuration decisions require knowledge of an installation parameter and/or a configuration parameter, e.g., parameters of a user's computer hardware, operating system parameters, other computer programs installed on the user's computer, etc. Without a user making the proper installation decision and/or configuration decision, an installed computer application may either not execute at all or alternately may not execute in the manner desired by the user.

FIGS. 1-5 show an example computer application that requires user input during installation and configuration. In particular, FIGS. 1-5 a sampling of the conventional configuration components for the Zimbra™ Collaboration Suite.

Before the installation of Zimbra™ even begins, Zimbra™ specifies that the disk partition be set as follows: The Mount Point/RAID Volume size for the /boot partition should be 100 MB, the Swap partition should be set to twice the size of the random access memory ("RAM") on your machine, and the Root partition (/) should be set with the remaining disk space size. FIG. 1 shows such pre-installation configuration of disk partition can be performed within an operating system (OS), e.g., Red Hat, setup.

Moreover, the Zimbra™ installation verifies that the correct prerequisite packages are installed, e.g., MySQL. If the correct prerequisite packages are installed, the installation process installs the Zimbra™ Collaboration Suite on a server. Otherwise, the installation of the Zimbra™ Collaboration Suite process ends to allow the use to install the correct prerequisite packages.

Zimbra™ requires a user to manually configure the hostname in the OS with the fully qualified hosthame of the Zimbra™ server, e.g., mailhost.example.com. A user must further configure the OS with the Network Gateway and Primary Domain Name Server (DNS) addresses. FIG. 2 shows such pre-installation configuration of the hostname and FIG. 3 shows such pre-installation configuration of a network gateway and primary DNS.

A user must further turn off their firewall, disable the Security Enhanced Linux (SELinux), and disable Sendmail in order to run the Zimbra™ Collaboration Suite.

The Zimbra™ Collaboration Suite runs on the Fedora™, Core 4 operating system. When installing the Fedora™ software for the Zimbra™ Collaboration Suite, a user is instructed to accept the default setup answers, except for the following steps: The Mount Point/RAID Volume size for the /boot partition should be 100 MB, the Swap partition should be set to twice the size of the RAM on your machine, and the Root partition (/) should be set with the remaining disk space size. The Hostname must be manually configured with the hostname name [mailhost.example.com] of the Zimbra™ server. A user must manually configure the Gateway and Primary DNS addresses in Fedora. A user must turn off their firewall and disable the Security Enhanced Linux (SELinux). A use must disable Sendmail in order to run Fedora™.

The installation process checks to see if Sendmail, Postfix, and MySQL software are running. If any of these applications is running, you are asked to disable them. Disabling MySQL is optional but highly recommended. Sendmail and Postfix must be disabled for the Zimbra collaboration Suite to start correctly. Next, the installer checks to see that the prerequisite software is installed. If NPTL, sudo, libidn, cURL, fetchmail, GMP or compat-libstdc++—are not installed, the install process quits. Accordingly, a user must fix the problem and restart the installation.

During the installation of Zimbra™, a menu of options are displayed to a user, as shown in FIG. 4. Some menu options include: setting the LDAP mast host, setting the LDAP port, setting the LDAP password, creating a domain, option to create an admin user, option to create an admin password, option to set various ports, option to enable SNMP notifications, option to enable backups, etc. As can be seen from FIG. 4, a user is presented with 11 menu options to tailor the configuration of the Zimbra™ Collaboration Suite.

FIG. 4 shows a user selecting menu option 6. Menu option 6 from FIG. 4 opens additional options for a user, as shown in FIG. 5. Some of the menu options from FIG. 5 include whether to create an administrator user, whether to create an administrator password, what HTTP port to use for the web server, whether to activate spell checking, etc. As can be seen from FIG. 5, a user is presented with 20 menu options to tailor the zimbra-store of the Zimbra™ Collaboration Suite.

The description provided herein is an abbreviated list of configuration choices given to a user during the installation of the Zimbra™ Collaboration Suite. Thus, there are numerous points within an installation of the Zimbra™ Collaboration Suite where a user can make an incorrect choice that will prevent the application, or a portion of the functionality of the application from functioning properly.

If a user has a question with any portion of the installation, a user can attempt to look up an answer on the Internet. Knowledgebase assistance is widely available at numerous websites on the Internet. However, to find an answer to a particular installation question a user must know what keywords to use in a search field in order to obtain a helpful answer. A use could literally spend hours searching a particular installation question before finding a helpful answer to their installation and/or configuration question.

Alternately, a user can attempt to call some type of help line or use an instant messaging window to obtain help from a live assistance person. However, calling a help line typically results in a uses having to wait for a help person to answer the call, a user has to properly describe their problem, and a user must hope they get a help person that has the knowledge that they need and can convey it in the manner that will assist the user. Likewise, using an instant messaging window requires a user to properly describe their problem to be able to obtain a meaningful response from the live assistance person.

Thus, proper installation and configuration of a software suite, such as the Zimbra™ Collaboration Suite, can be a daunting and frustrating procedure for most users. Although assistance can be obtained through a telephone call and/or an Internet connection, obtaining such assistance can also be a daunting and frustrating procedure for most users.

Accordingly, the present teachings solve these and other problems of the prior art associated with installation and configuration of an application program.

BRIEF DESCRIPTION OF THE DRAWINGS

The accompanying drawings, which are incorporated in and constitute a part of this specification, illustrate embodiments of the teachings and together with the description, serve to explain the principles of the teachings.

FIGS. 1-5 show an example of a conventional computer application that requires user input during installation and configuration.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

An installation and/or configuration assistant ("ICA") disclosed herein can provide a user with near-real time knowledgebase information and instant messaging chat functionality to assist the user in installing and/or configuring an application. The ICA can monitor an application installation to determine a particular point of progress within an installation and/or configuration. The ICA sends information about the particular installation point of progress to a knowledgebase database as a query to, e.g., a knowledgebase server. The knowledgebase server in response to the information about the particular installation point of progress can perform a knowledgebase database query to find relevant information about the particular installation progress point. The knowledgebase server can send the knowledgebase information back to the ICA for presentation in a knowledgebase window. An optionally an instant messaging chat session can be displayed within a chat window to assist a user with the installation and/or configuration.

Figure 1:
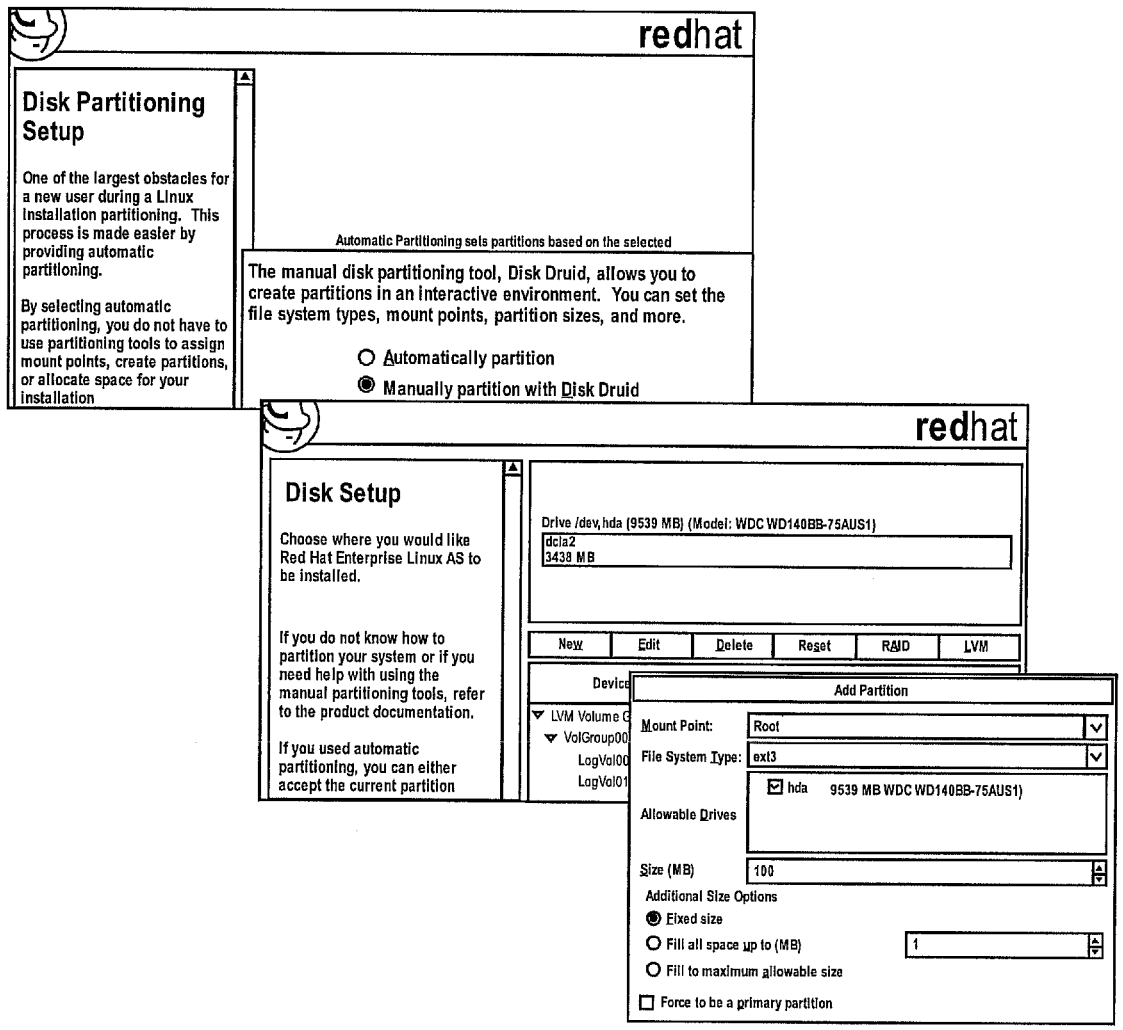
Figure 2:
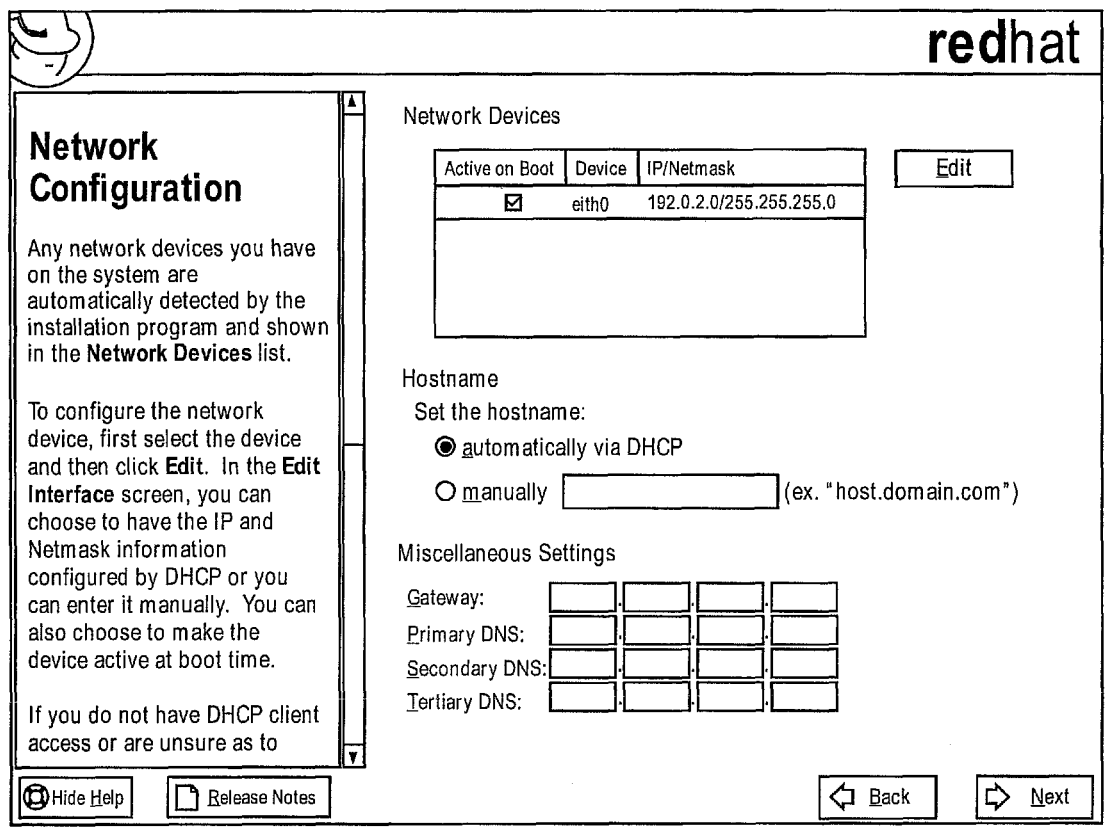
Figure 3:
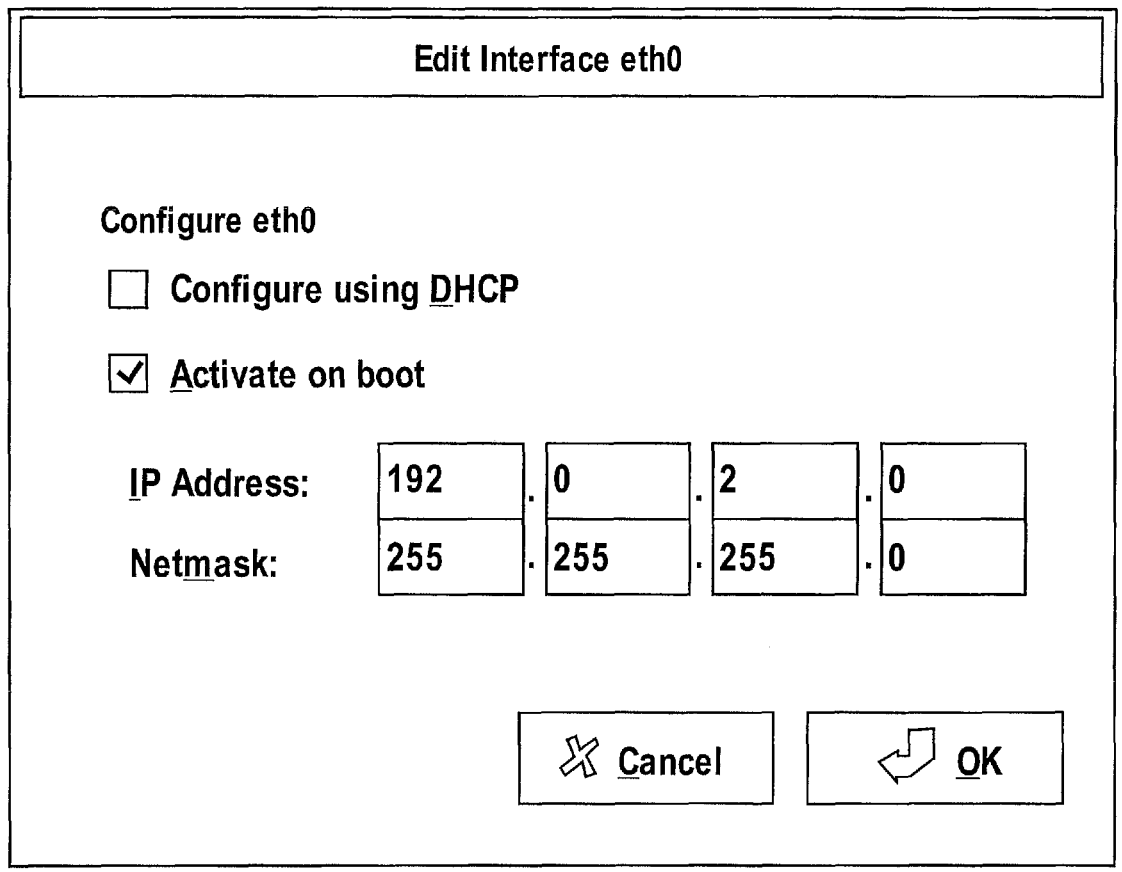
Figure 6:
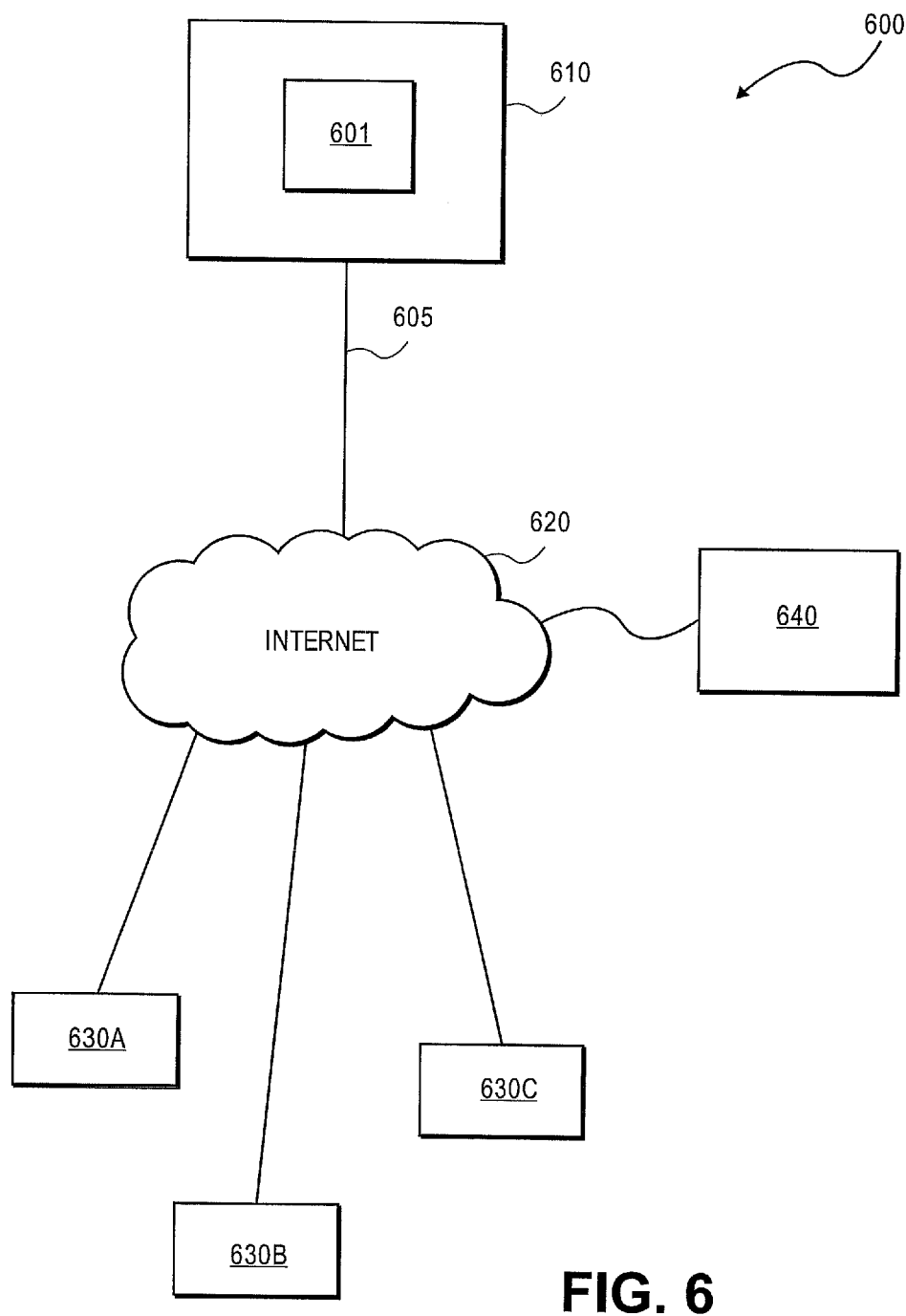
FIG. 6 shows a system that allows an installation and/or configuration assistant to communicate with sources of assistance, in accordance with an embodiment of the present teachings.

FIG. 6 shows a system 600 that allows an ICA 601 to communicate with sources of assistance 630a-630c, in accordance with an embodiment of the present teachings.

It should be readily apparent to those of ordinary skill in the art that the system 600 shown in FIG. 6 represents a generalized system illustration and that other components can be added or existing components can be removed or modified while still remaining within the spirit and scope of the present teachings.

In particular, ICA 601 can be executing on a personal computer 610. ICA 601 can be implemented in hardware, in software, or a combination of hardware and software. Implementing ICA 601 in hardware or a combination of hardware or software would have personal computer 610 communicating with ICA 601 over a data interface, not shown, e.g., a universal serial bus, a Peripheral Component Interconnect ("PCI") interface, a Firewire interface, etc.

ICA 601 can be executed on any computing device that would benefit from assistance during an installation and/or configuration. For instance, ICA 601 can be executed on, e.g., a laptop computer, a server, a PDA, a smartphone, a mainframe computer, a cellular telephone, etc. The principles disclosed herein apply to any computing device that relies on any type of installation and/or configuration.

Personal computer 610 executing ICA 601 can connect to the Internet 620 via an Internet Service Provider (ISP), not shown, through an appropriate network connection 605, e.g., Ethernet.

ICA 601 can be configured to access at least one knowledgebase server 630a via known Internet communication protocols, e.g., Transmission Control Protocol/Internet Protocol ("TCP/IP"), using known Internet addressing schemes. The knowledgebase server 630a can contain knowledgebase information that can assist a user with an installation and/or configuration of a selected application. ICA 601 can send a point of progress within an installation and/or configuration, as discussed below, to the knowledgebase server 630a via the Internet 620 to retrieve knowledgebase information about that point of progress within the installation and/or configuration.

ICA 601 can also be configured to allow a user to communicate with a live assistant 640 via known Internet communication protocols, e.g., TCPIP, using known Internet addressing schemes. ICA 601 sends point of progress data within an installation and/or configuration, as discussed above as being sent to a knowledgebase server, to the live assistant 640 via the Internet 620 to allow the live assistant 640 to determine the particular point of progress within an installation and/or configuration. Once the live assistant 640 determines the particular point of installation and/or configuration, they can instant message with the ICA 601 to assist a user through whatever problem they are encountering during an installation and/or configuration.

The knowledgebase server 630a can be configured to execute a web crawler to search the Internet 620 to populate a knowledgebase database with common solutions to installation and/or configuration problems. With knowledgebase server 630a collecting common solutions to installation and/or configuration problems from a plurality of other knowledgebase servers, third party technical websites, vendor websites, etc. connected to the Internet, e.g., servers 730b and 730c. ICA 601 need only address a single source for its knowledgebase information.

Alternately, ICA 601 can address a plurality of knowledgebase servers 630a, 630b and 630C via known Internet communication protocols, e.g., TCPIP, using known Internet addressing schemes. Each of the knowledgebase servers 630a, 630b and 630c can contain knowledgebase information that assists the user with an installation and/or configuration. ICA 601 sends point of progress data associated with an installation and/or configuration to the knowledgebase servers 630a, 630b and 630c via the Internet 620 as a query to retrieve knowledgebase information about that point of progress within the installation and/or configuration.

Figure 7:
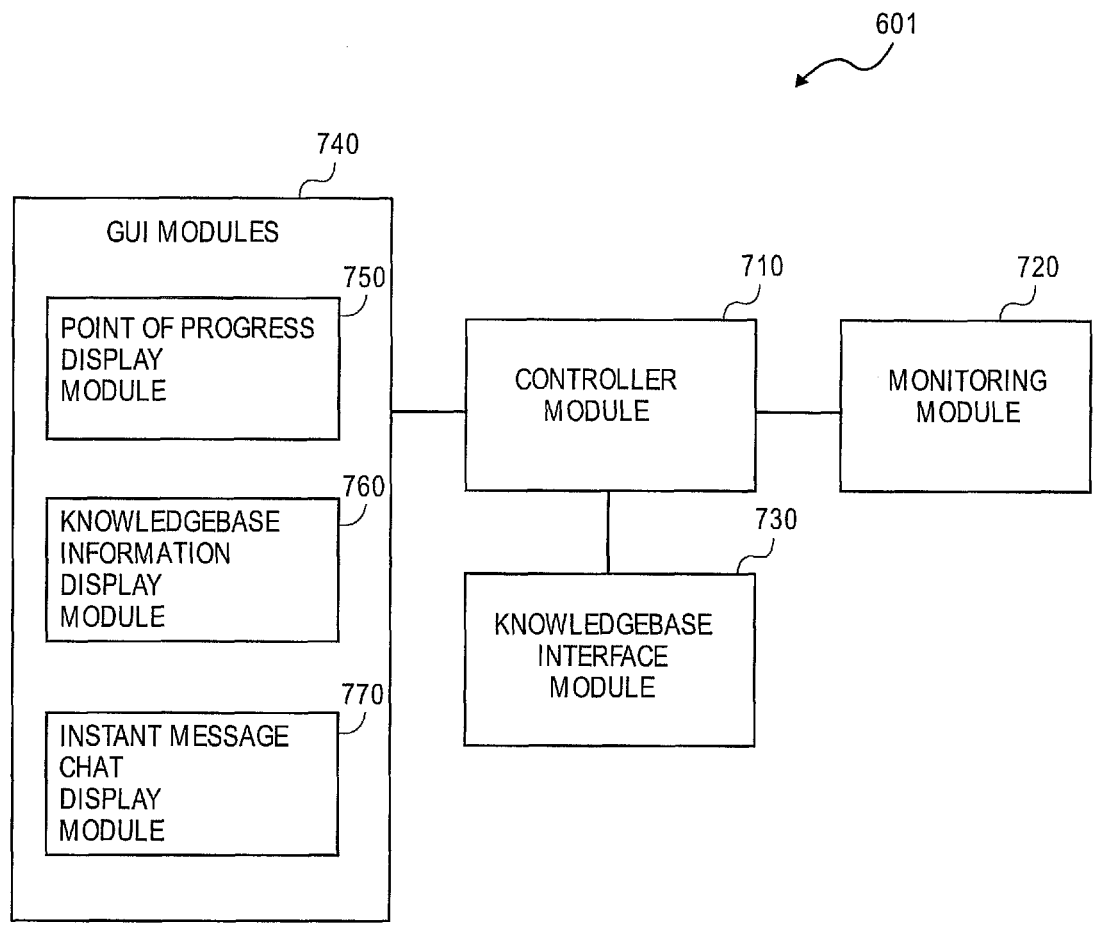
FIG. 7 shows the modules that can make up an installation and/or configuration assistant, in accordance with another embodiment of the present teachings.

FIG. 7 shows the modules that can make up an installation and/or configuration assistant 601, in accordance with another embodiment of the present teachings.

It should be readily apparent to those of ordinary skill in the art that the installation and/or configuration assistant 601 shown in FIG. 7 represents a generalized system illustration and that other components can be added or existing components can be removed or modified while still remaining within the spirit and scope of the present teachings.

In particular, FIG. 7 shows ICA 601 can be configured with various modules that can perform individualized functions to assist a user with an installation and/or configuration. ICA 601 can include a GUI modules 740, a controller module 710, a knowledgebase interface module 730, and a monitoring module 720.

Controller module 710 can oversee the processes being performed by the other modules within ICA 601, e.g., GUI modules 740, knowledgebase information module 730 and monitoring module 720, and facilitates the transfer of information from between the various modules that make up ICA 601. Moreover, controller module 710 can provide an interface with various sources of data outside of the ICA system 700 that can provide assistance to a user during an installation and/or configuration such as, e.g., an internet interface, an Intranet, a dial-up interface, a local database interface, etc.

Monitoring module 720 can monitor an installation and/or configuration to determine a point of progress within the installation and/or configuration, and can formulate point of progress data.

Knowledgebase interface module 730 can receive the point of progress data from the monitoring module 720. The knowledgebase interface module 730 can send the point of progress data to a knowledgebase database as a query to retrieve knowledgebase information relevant to the point of progress.

Graphic User Interface ("GUI") modules 740 can include a point of progress display module 750, a knowledgebase information display module 760 and a instant message chat display module 770.

Point of progress display module 750 can display the point of progress within an installation and/or configuration to allow a user to visually track an installation and/or configuration.

Knowledgebase information display module 760 can display knowledgebase information related to the point of progress within an installation and/or configuration.

Instant message chat display module 770 can display the text of an instant messaging chat session that can be established with a live assistant that is attempting to assist a user with an installation and/or configuration.

The modules that make up ICA 601, i.e., controller module 710, monitoring module 720, knowledgebase interface module 730 and GUI modules 740 can each be executed in hardware, in software, or a combination of hardware and software.

Figure 8:
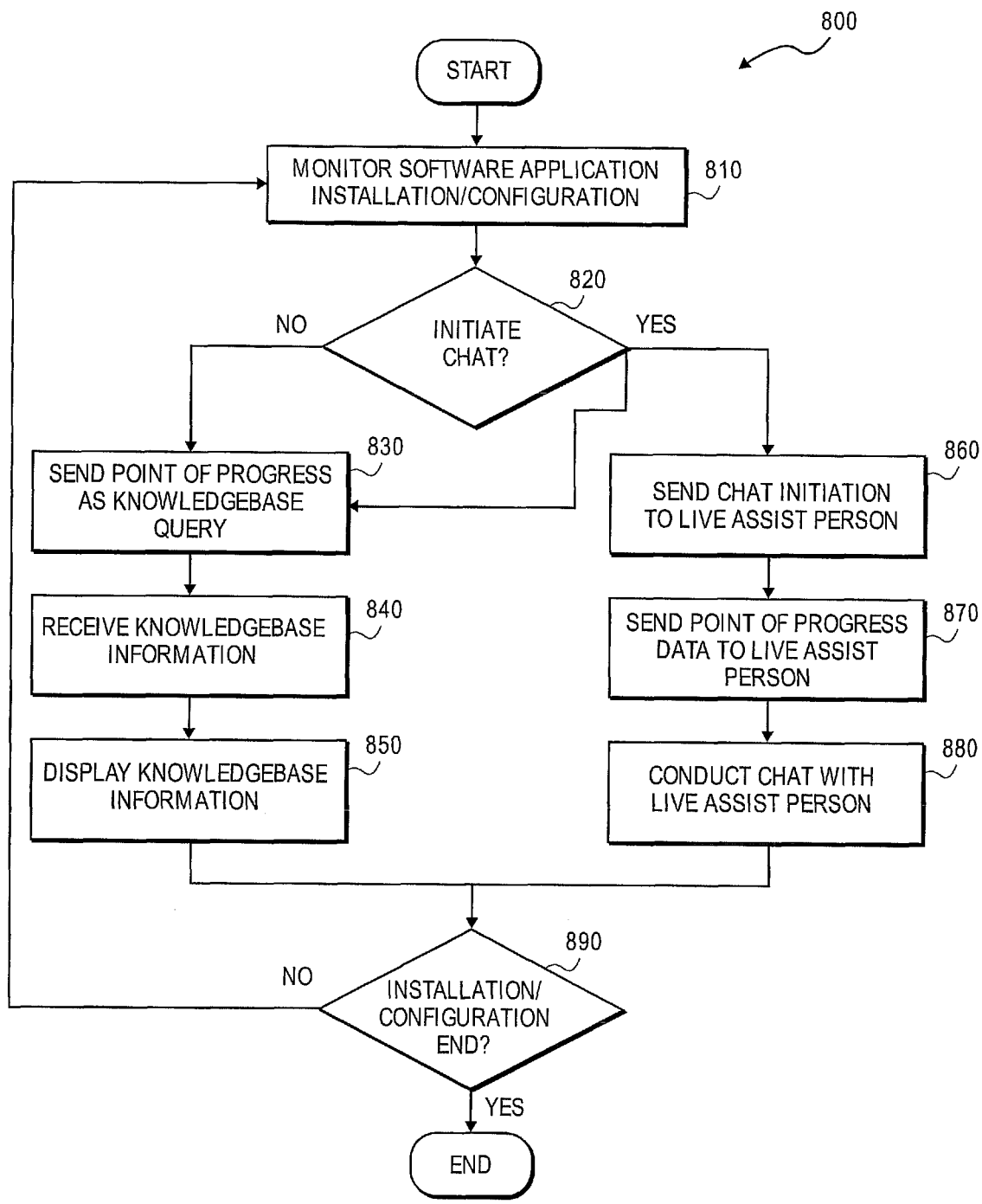
FIG. 8 shows a flow chart for the steps that can be performed by an installation and/or configuration assistant, in accordance with another embodiment of the present teachings.

FIG. 8 shows a flow diagram 800 for the steps that can be performed by an installation and/or configuration assistant 601, in accordance with an embodiment of the present teachings.

It should be readily apparent to those of ordinary skill in the art that the flow diagram 800 shown in FIG. 8 represents a generalized flow diagram illustration and that other steps can be added or existing steps can be removed or modified while still remaining within the spirit and scope of the present teachings.

The steps performed by ICA 601 can include a step 810 that can monitor a software application installation and/or configuration. In particular, the monitoring of the software application installation and/or configuration at step 810 can be performed by an appropriately configured monitoring module 720. Monitoring module 720 can run in parallel to a software application installation and/or configuration to monitor a point of progress within the software application installation and/or configuration. Such point of progress can be determined by the monitoring module 720 through monitoring of, e.g., keywords displayed to a user during the software application installation and/or configuration, monitoring of files being transferred to a mass storage device, e.g., a hard drive, during the software application installation and/or configuration, etc. Any method that allows the monitoring module 720 to determine a point of progress within a software application installation and/or configuration is within the spirit and scope of the present teachings.

Step 820 is a conditional branch step that can conditionally branch based on a determination if a user initiates an instant message chat session with a live assistant 640. The determination whether to conditionally branch in step 820 can be performed by an appropriately configured monitoring module 720. The monitoring module 720 can continuously monitor whether a user, e.g., performs a predefined key stroke, clicks a GUI button, etc. to initiate the instant message chat session with a live assistant 640.

If the decision of step 820 confirms that a user initiates an instant message chat session with a live assistant 640, step 820 branches to both steps 860 and 830 to be processed in parallel by an appropriately configured controller module 710. If the decision of step 820 determines that a user does not desire to initiate an instant message chat session with a live assistant 640, step 820 branches only to step 830 by an appropriately configured controller module 710.

Step 830 can send point of progress data as determined in step 810 by an appropriately configured monitoring module 720 to at least one knowledgebase database 630a-630c as a knowledgebase query. The configured monitoring module 720 can retrieve the point of progress data stored at any appropriate location, e.g., a hard drive, RAM, a point of progress storage module, etc. The point of progress data is packed as a query by the knowledgebase interface module 730 for transmission to any of the knowledgebase databases 630a-630c. Transmission of the point of progress data can include any available data transmission format, e.g., TCP/IP.

Step 840 can receive the knowledgebase information from at least one knowledgebase database 630a-630c by an appropriately configured controller module 710. The knowledgebase interface module 730 receives the knowledgebase information from at least one knowledgebase database 630a-630c. The knowledgebase interface module 730 then passes the knowledgebase information to the controller module 710.

Step 850 can display the knowledgebase information in a knowledgebase window for a user's review by an appropriately configured knowledgebase information display module 760. The knowledgebase information passed to the controller module 760 in step 840 is further passed to the knowledgebase information display module 760. The knowledgebase information display module 760 can then format the knowledgebase information in a preconfigured format for display. The preconfigured format can include, e.g., highlighting of terms, minimizing/eliminating sentence wrapping, indenting, setting of font and/or font size, etc. Preferably, the preconfigured format for display is approximately the same ICA 601 independent of the software application being installed and/or configured. In this manner, a user can become fairly accustomed to the format of the help being provided independent of the software application being installed and/or configured.

Step 860 can send an instant message chat initiation signal to a live assistant 640 to initiate an instant message chat session with the live assistant 640 by an appropriately configured controller module 710. The controller module 710 can formulate an instant message chat initiation signal that can include, e.g., an address of the initiating party, any formatting information to be used during the instant message chat session, etc. The instant message chat initiation signal can then transmitted by the controller module 710 using any available data transmission format, e.g., TCP/IP.

Step 870 can send point of progress data by an appropriately configured controller module 710 to a live assistant 640 to allow the live assistant 640 to be able to determine the particular point of progress within an installation and/or configuration. In particular, the controller module can retrieve the stored point of progress data from any appropriate location as discussed above, e.g., a hard drive, RAM, a point of progress storage module, etc. The point of progress data can then transmitted by the controller module 710 using any available data transmission format, e.g., TCP/IP, to the live assistant 640.

Step 880 can execute an instant message chat session with a live assistant 640 by an appropriately configured controller module 710. Controller module 710 controls the flow of chat data between the live assistant 640 and the personal computer 610. In particular, the controller module reads chat data entered by a user seeking assistance in the instant message chat display module 770. The chat data received by the controller module 710 from the live assistant 640 is passed to the instant message chat display module 770 for display within a GUI, i.e., to allow a user seeking assistance to view a chat session. ICA 601 can rely on known Instant message chat protocols, e.g., .NET Messenger Service (MSN Messenger and Windows Live Messenger), AOL Instant Messenger, Excite/Pal, Gadu-Gadu, Google Talk, iChat, ICQ, Jabber, Qnext, QQ, Meetro, Skype, Trillian, Yahoo! Messenger, etc. or can rely on a unique instant message chat protocol within the spirit and scope of the teachings.

Moreover, step 880 can include a live assistant 640 sending a user knowledgebase information during an instant message chat session for review in a knowledgebase information display module 760. In this manner, a live assistant 640 and a personal computer 610 can more effectively troubleshoot a software application installation and/or configuration than having a live assistant person conventionally verbally communicate such knowledgebase information to a user.

Step 890 is a conditional branch step that conditionally branches based on a determination if an software application installation and/or configuration has reached its end. An appropriately configured controller module 710 can perform the determination of step 890. If the decision in step 890 by controller module 710 confirms that a software application installation and/or configuration has reached its end, step 890 branches to end the ICA 601. An appropriate notification can be given to a user to notify finality of the software application installation and/or configuration. If the decision of step 890 determines that an installation and/or configuration has not reached its end, controller 710 branches to step 810 to further monitor the software application installation and/or configuration.

Thus, ICA 601 always provides knowledgebase information to a user whether a user chooses to initiate an instant message chat session or not. In this way a user can review knowledgebase information while the user is conducting the instant message chat session.

Moreover, a live assistant 640 can send a user knowledgebase information during an instant message chat session for review in a knowledgebase window. In this manner a live assistant 640 and a personal computer 610 can more effectively troubleshoot a software application installation and/or configuration than conventionally having to verbally communicate such knowledgebase information to a user.

Figure 9:
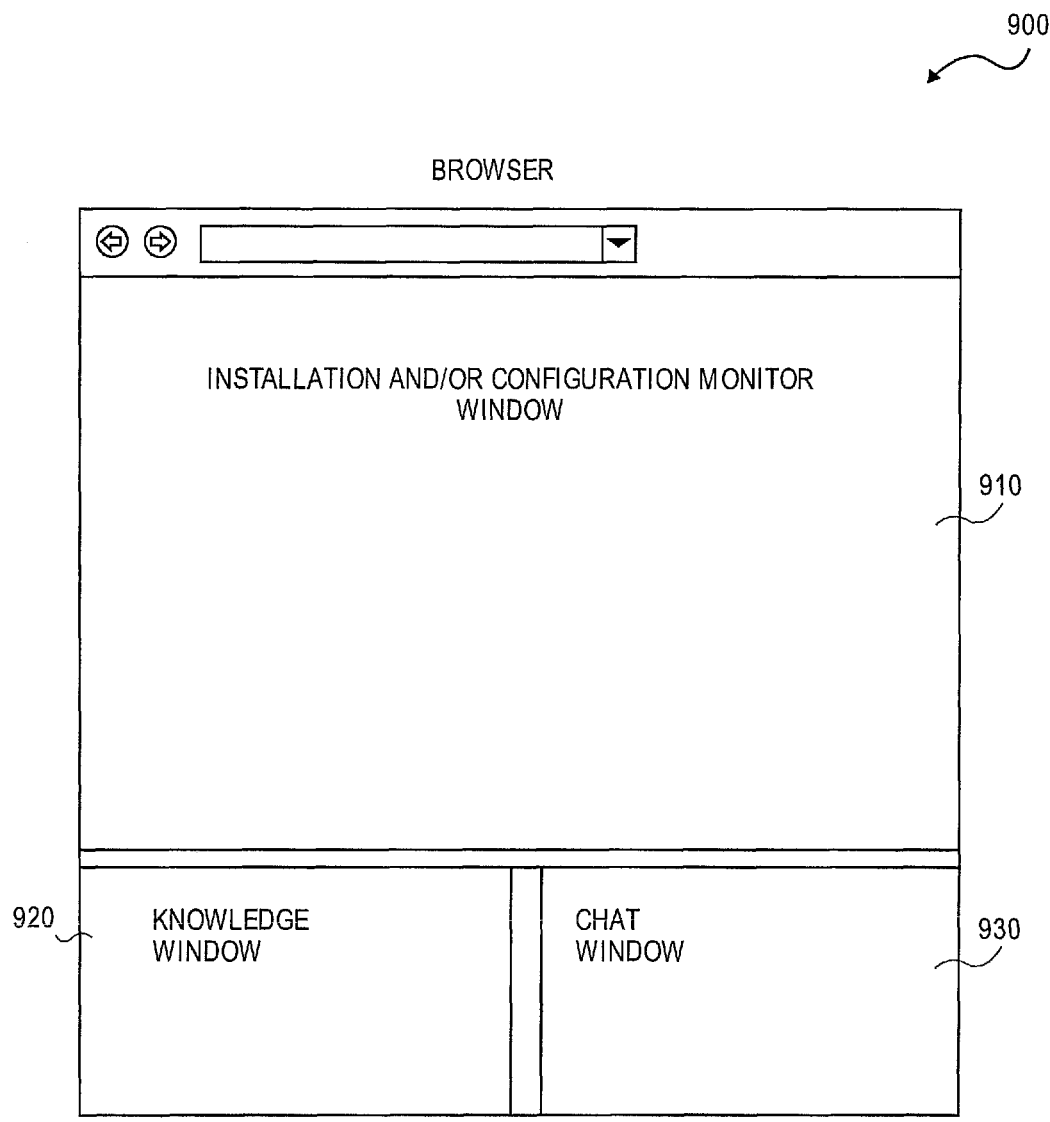
FIG. 9 shows an example user interface for an installation and/or configuration assistant, in accordance with another embodiment of the present teachings.

FIG. 9 shows an example user interface 900 for an installation and/or configuration assistant 601, in accordance with an embodiment of the present teachings.

It should be readily apparent to those of ordinary skill in the art that the user interface 900 shown in FIG. 9 represents a generalized system illustration and that other components can be added or existing components can be removed or modified while still remaining within the spirit and scope of the present teachings.

In particular, the user interface 900 for ICA 601 can include a web browser, e.g., Firefox, Opera, Internet Explorer, etc., that has been modified to include an installation monitor window 910, a knowledgebase window 920 and a chat window 930. A web browser can be modified to perform the installation monitor window 910 function, the knowledgebase window 920 function and the chat window 930 function using any of a variety of web browser programming languages including but limited to, e.g., Hypertext Markup Language (HTML), Java, Asynchronous JavaScript and XML (Ajax), etc.

Alternately, the installation monitor window 910 function, the knowledgebase window 920 function and the chat window 930 function can be implemented in a standalone program that does not rely on a web browser. Such a standalone program can be written in any of a variety programming languages including but not limited to, e.g., Fortran, C, Visual Basic, Visual C, etc.

ICA 601 using a user interface 900, e.g., web browser, can be a shell program that executes a separate application installation executable that performs the necessary steps to install a desired application on a user's computer. Moreover, ICA 601, e.g., web browser, can monitor an application's installation progress to determine a point of progress within an installation and/or configuration. The point of progress is used to send information to and retrieve information from a knowledgebase database to assist a user in installing and/or configuring a desired application, e.g., Zimbra™ Collaboration Suite. Example types of information that are sent and received from the Internet to assist a user in installing and/or configuring a desired application are described in detail below.

Knowledgebase window 920 automatically displays knowledgebase information related to an application's installation and/or configuration. As discussed ICA 601 monitors an application's installation and/or configuration progress. ICA 601 sends information about a particular point within an installation and/or configuration process to a knowledgebase database as a query to retrieve knowledgebase information related to the point of progress within an installation and/or configuration. In this manner, a user is continuously given the latest relevant information related to a particular point of progress within an installation and/or configuration. Moreover, knowledgebase window 920 can display knowledgebase information that is sent to a user from a live assistant 640.

Knowledgebase information can include, e.g., a manufacturer's common questions and answers for a program's installation and/or configuration, technical assistance web sites that are directed toward Information Technology (IT) professionals, blog postings, etc. Such information can be collected at a central point of disbursement, such as a knowledgebase information server. A data gathering tool, e.g., a web crawler, can be used to gather the knowledgebase information from various sources throughout the Internet for storage on a knowledgebase information server. In this manner ICA 601 can retrieve information for display within knowledgebase window 920 from a single location, i.e., a knowledgebase information server. Alternately, ICA 601 can also be configured to connect to multiple known sources of knowledgebase information.

Chat window 930 provides a user an alternate way to obtain assistance during an application installation and/or configuration. Chat window 930 can be used in combination with knowledgebase window 920 or as a primary source of assistance for a user during an application installation and/or configuration. Although knowledgebase window 920 automatically displays knowledgebase information related to an application's installation and/or configuration, a user can choose to ignore such information and activate an instant messaging chat session within chat window 930.

Chat window 930 allows a user to establish an instant messaging chat session with a live assistant 640. Upon activation by a user, the instant messaging chat session is automatically established with the appropriate live assistant 640 that has experience with the particular computer application the user is attempting to install and/or configure, i.e., Zimbra™ Collaboration Suite. Various instant messaging protocols can be used with the chat window 930, e.g., such as Yahoo™ Instant Messenger, Google Talk™, AOL Instant Messenger™, AIM™, etc.

Figure 10:
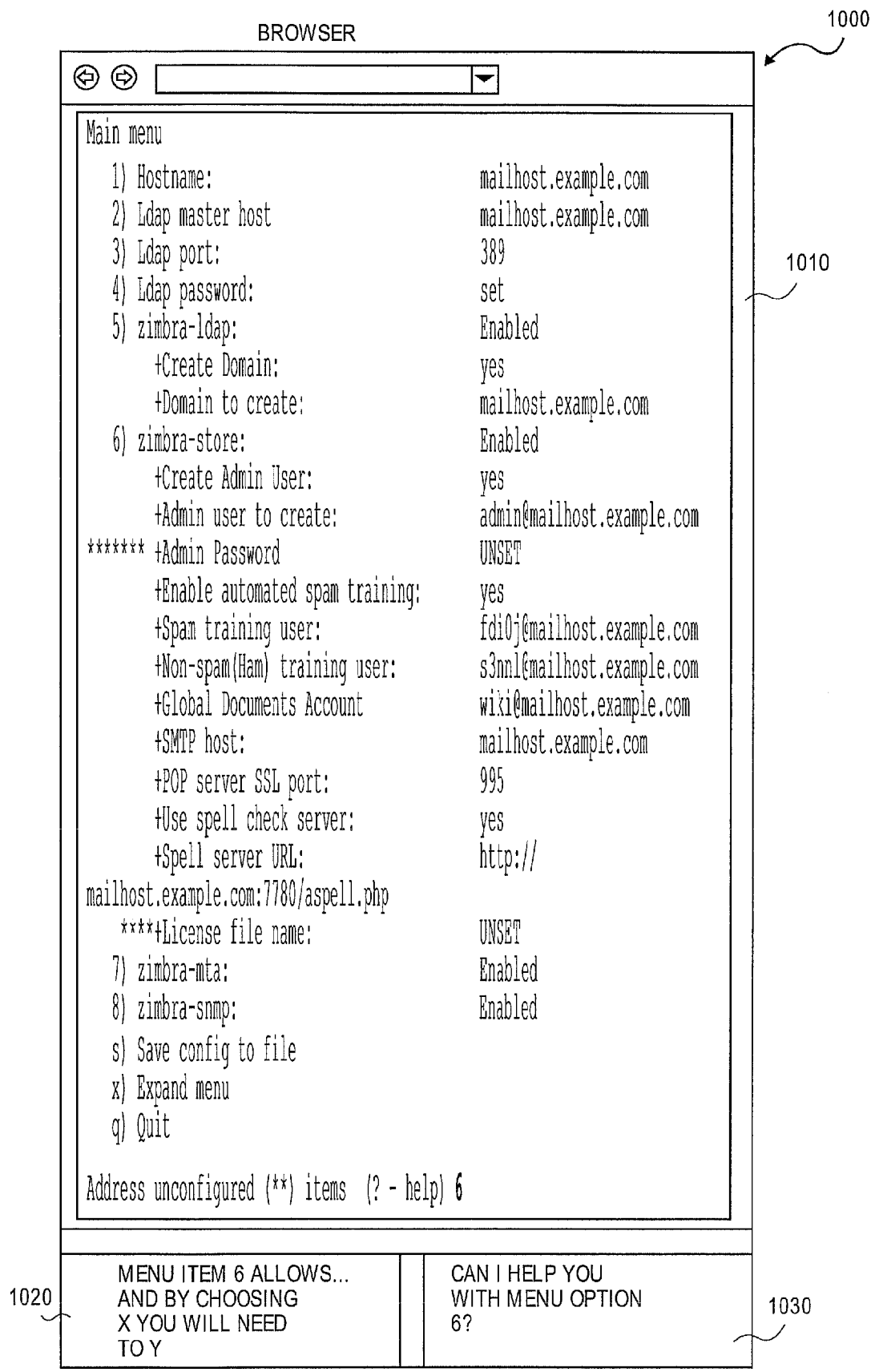
FIG. 10 shows an example installation and/or configuration assistant that is used to assist a user in configuring the Zimbra™ Collaboration Suite shown in FIG. 4, in accordance with another embodiment of the present teachings.

FIG. 10 shows an example installation and/or configuration assistant 601 that is used to assist a user in configuring the Zimbra™ Collaboration Suite shown in FIG. 4, in accordance with an embodiment of the present teachings. The installation monitor window 1010 shows details of an application's installation progress and/or configuration. Using the example from FIG. 4, installation monitor window 1010 shows a menu of options that are displayed to a user during the configuration of the Zimbra™ Collaboration Suite.

Since the example given in FIG. 6 for an ICA 601 is a shell program that monitors an application's installation progress that is occurring at any given point in time, information about such an application's installation progress can be viewed within a web browser installation window 1010. An application's installation point of progress can be sent to the Internet as a query to retrieve real-time assistance. The real-time assistance for the application's installation progress is shown in the knowledgebase window 1020 and chat window 1030. Thus, knowledgebase window 1020 provides targeted answers at approximately the same instance a user encounters installation and/or configuration issues within installation window 1010.

For example, a user installing the Zimbra™ Collaboration Suite is presented with the menu options list shown in installation and/or configuration monitor window 1010. As shown in FIG. 10, a user selects menu option "6) zimbra-store:". The user's choice of menu option "6)" is sent to a knowledgebase server in order to retrieve corresponding knowledgebase information about zimbra-store menu choice. In particular, knowledgebase window 1020 can show a user, e.g., what is meant by the various options under the zimbra-store menu option, show a user the possible input options under the zimbra-store menu option and/or possibly show a user the outcome if a user enters a wrong zimbra-store menu option. Knowledgebase window 1020 can show a user any information that ICA 601 is able to retrieve that would be of assistance to the use in the installation and/or configuration of an application the user is attempting to install and/or configure.

Chat window 930 preferably provides a user an alternate way to obtain assistance during an application installation and/or configuration. Chat window 930 can be used in combination with knowledgebase window 920 or as a primary source of assistance for a user during an application installation and/or configuration.

Chat window 930 connects over an Internet connection with a live assistant 640 that is able to troubleshoot a user's application installation and/or configuration. As discussed above, conventionally when a user interacts with a live assistance person for assistance during an installation and/or configuration, either verbally or through some type of instant messaging window, a user must describe their particular problem, i.e., must be able to pose a very particular question to the live assistance person. The live assistance person cannot help a user if the user is unable to describe their particular problem. To overcome the deficiency within the prior art of having to have a user convey their particular problem with a live assistance person, the information about an application's installation and/or configuration point of progress is collected by ICA 601. The application's installation and/or configuration progress is sent to the live assistant 640 to either eliminate a user having to describe their particular problem with an application's installation and/or configuration and/or to minimize a user having to describe their particular problem with an application's installation and/or configuration. In this manner, a user's burden of having to determine how to open a chat window with a proper live assistance person is eliminated. Moreover, a user's burden of having to properly convey their particular problem to a live assistant 640 is minimized and/or eliminated.

The knowledgebase information is described above as residing on a knowledgebase server(s). However, the principles disclosed herein apply equally to a knowledgebase information database being part of ICA 601 stored on a CD, DVD, flash drive, hard drive, etc. With such an alternative configuration, ICA 601 can search locally for knowledgebase information. However, ICA 601 would still have the ability to supplement the local knowledgebase information with knowledgebase information that resides on a remote knowledgebase server. In this manner, ICA 601 can provide knowledgebase information very quickly for a user from a local knowledgebase database, while simultaneously providing a user with more up to date knowledgebase information that can be stored on a remote knowledgebase server.

ICA 601 is described herein as being a shell program that executes a program installation executable that performs the necessary steps to install a desired program on a user's computer, and monitors a program's installation progress to determine at what particular point within an installation and/or configuration process the installation progress is at. However, within the spirit and scope of the present teachings ICA 601 can itself be a program installation executable that provides functionality beyond conventionally performing the necessary steps to install a desired program on a user's computer. ICA 601 can itself be a program installation executable that further performs installation and/or configuration functions. In this instance, ICA 601 functions would not be performed from within a web browser as described above.

Moreover, ICA 601 is described herein as being used to assist a user in the installation and/or configuration of an application program ICA 601 can also be used to assist a user with any type of computer configuration, e.g., a web based process. For example, ICA 601 described herein can be used to assist a user with setting up an account on, e.g., Ebay™. A novice computer use may find the process of setting up an account on a purchasing web site, such as Ebay™, intimidating. ICA 601 disclosed herein can provide knowledgebase information and instant messaging chat functionality to greatly simplify a web based process of, e.g., such as setting up an account on Ebay™. Thus, ICA 601 disclosed herein can be used with a variety of computer processes without departing from the spirit and scope of the present teachings.

While the teachings has been illustrated with respect to one or more implementations, alterations and/or modifications can be made to the illustrated examples without departing from the spirit and scope of the appended claims. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. It is intended that the specification and examples be considered as exemplary only, with a true scope and spirit of the teachings being indicated by the following claims.

What is claimed is:

1. A method, comprising:
    detecting achievement of a point of progress before completion of a web based installation of software;
    sending data associated with the point of progress to a server to perform a query of a knowledgebase with the data to identify information associated with the point of progress;
    receiving the information from the server in response to the server performing the query of the knowledgebase; and
    providing the information to a user to assist the user with completing the web based installation of software.

2. The method according to claim 1, further comprising:
    establishing an instant messaging chat session with a live assistant person to assist the user with the web based installation of software.

3. The method according to claim 1, wherein data associated with the knowledgebase resides on the server.

4. The method according to claim 1, wherein the information is received over an internet connection.

5. The method according to claim 1, further comprising monitoring an application installation executable with a shell program.

6. The method according to claim 1, wherein the web based installation of software is an execution of an application installation executable.

7. The method according to claim 1, wherein the information is displayed within a web browser.

8. The method according to claim 1, further comprising assisting the user with the web based installation of software.

9. The method according to claim 1, wherein the web based installation of software comprises a process to set up an account with a web service.

10. The method of claim 1, wherein the web based installation of software comprises installing the software via the web.

11. The method of claim 1, wherein the web based installation of software comprises monitoring installation of software via a web browser.

12. A system, comprising:
    an interface to a controller module; and
    a processor, communicating with the controller module via the interface, the processor to:
        detect achievement of a point of progress before completion of a web based installation of software;
        send data associated with the point of progress to a server to perform a query of a knowledgebase with the data to identify information associated with the point of progress;
        receive the information from the server in response to the server performing the query of the knowledgebase; and
        provide the information to a user to assist the user with completing the web based installation of software.

13. The system according to claim 12, the processor to establish an instant messaging chat session with a live assistant person to assist the user with the web based installation of software.

14. The system according to claim 12, wherein data associated with the knowledgebase resides on the server.

15. The system according to claim 12, wherein the information is received over an internet connection.

16. The system according to claim 12, wherein the web based installation of software comprises a process to set up an account with a web service.

17. The system of claim 12, wherein the web based installation of software comprises installing the software via the web.

18. The system of claim 12, wherein the web based installation of software comprises monitoring installation of software via a web browser.

* * * * *